United States Patent [19]

Goel et al.

[11] Patent Number: 4,579,877

[45] Date of Patent: Apr. 1, 1986

[54] USE OF BICYCLIC AMIDE ACETALS IN POLYURETHANE/POLYISOCYANURATE RIGID FOAMS AS REACTIVE COMPATIBILIZERS

[75] Inventors: Anil B. Goel, Worthington; Timothy A. Tufts, Columbus, both of Ohio

[73] Assignee: Ashland Oil, Inc., Ashland, Ky.

[21] Appl. No.: 732,490

[22] Filed: May 10, 1985

[51] Int. Cl.[4] .................. C08G 18/14; C08G 18/30; C08G 18/42
[52] U.S. Cl. ........................... 521/163; 521/173; 521/902; 252/182; 528/73
[58] Field of Search ................ 521/163, 902, 173; 528/73; 252/182

[56] References Cited

U.S. PATENT DOCUMENTS

| | | | |
|---|---|---|---|
| 3,647,759 | 3/1972 | Walker | 528/308.3 |
| 4,237,238 | 12/1980 | DeGuiseppi et al. | 521/173 |
| 4,246,364 | 1/1981 | Koehler et al. | 521/160 |
| 4,339,343 | 7/1982 | Koehler et al. | 521/118 |
| 4,444,916 | 4/1984 | Grube et al. | 521/131 |

*Primary Examiner*—Herbert S. Cockeram
*Attorney, Agent, or Firm*—John E. Jones

[57] ABSTRACT

The use of bicyclic amide acetals as compatibilizing agents in the preparation of rigid polyurethane/polyisocyanate foams from certain polyol mixtures, polyisocyanates and fluorocarbon blowing agents is disclosed.

17 Claims, No Drawings

USE OF BICYCLIC AMIDE ACETALS IN POLYURETHANE/POLYISOCYANURATE RIGID FOAMS AS REACTIVE COMPATIBILIZERS

This invention relates to the use of bicyclic amide acetals as reactive compatibilizers in the formation of certain polyurethane/polyisocyanurate rigid foams and more particularly pertains to the use of bicyclic amide acetals to improve the compatibility between fluorocarbon blowing agents and polyols in the formation of polyurethane/polyisocyanurate rigid foam.

U.S. Pat. No. 4,237,238 describes improved polyisocyanurate foams of high degree of fire resistance with low smoke evolution on combustion and low friability obtained by the reaction of polyisocyanates and a terephthalic ester polyol in the presence of a blowing agent. Such polyols obtained by the transesterification of a residue of dimethylterephthalate with a glycol of molecular weight 60 to 400 are more completely described in U.S. Pat. No. 3,647,759. Although the foams have some good properties, unfortunately, the polyols used in U.S. Pat. No. 4,237,238 have poor compatibility with the fluorocarbon blowing agent. U.S. Pat. No. 4,339,343 discloses miscible blends of 20–85% alkoxylated alkyl amines with 15–80% primary hydroxyl polyols and fluorocarbon blowing agent. The use of amide diols of the type described in U.S. Pat. No. 4,246,364 as compatibilizing agent has been disclosed in U.S. Pat. No. 4,444,916.

We have now found that the addition of small amounts of bicyclic amide acetals having the Formula I to certain polyols used in the formation of polyurethane/polyisocyanurate rigid foams wherein fluorocarbon blowing agent is used leads to significant improvement in the compatibility of the fluorocarbon and polyol which in turn leads to a rigid foam which is of a uniform cellular structure throughout

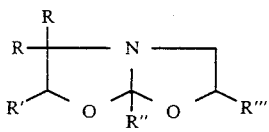

I wherein R represents hydrogen or an alkyl group having from 1 to 10 carbon atoms, R' represents hydrogen, an alkyl group having from to 10 carbon atoms or an aryl group having from 1 to 20 carbon atoms, an aryl group having from 6 to 12 carbon atoms or an alkaryl group having from 7 to 20 carbon atoms and R''', represents hydrogen, an alkyl group having from 1 to 20 carbon atoms, an aryl group having from 6 to 12 carbon atoms, an alkyl ether group having from 1 to 20 carbon atoms or an aryl ether group having from 6 to 20 carbon atoms.

The fluorocarbon blowing agent used in this invention is normally used in amounts between about 5 and about 50% by weight, preferably between about 10 and about 35% by weight based on polyisocyanate with the amount used depending largely upon the desired foam density. The amount used will effect foam density and closed cell content of the foam. This will usually result in blowing agent being present in the reaction mixture of the invention in amounts between about 15 and about 175% by weight based on the total polyol. Trichlorofluoromethane is preferred as the blowing agent. Other suitable blowing agents include, for instance, dichlorodifluoromethane, 1,1-dichloro-1-fluoroethane, hexafluorocyclobutene and octafluorocyclobutane.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene methane diisocyanate, 4,4'diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two or more fully disclosed in U.S. Pat. No. 3,350,362 and 3,382,215. Polyisocyanates which are polymeric in nature including isocyanate prepolymers of all types are included in this invention.

Isocyanate trimerization catalysts are preferably included in the mixtures of this invention prior to foaming of same. The isocyanate trimerization catalysts employed in this invention can be any catalyst known to those skilled in the art which will catalyze the trimerization of an organic isocyanate compound to form the isocyanurate moiety. Trimerization catalyst is usually used in amounts between about 0.1 and about 5% by weight based on the weight of the polyisocyanate. Most commonly used trimerization catalysts also function to catalyze the reaction of polyol and isocyanate to form urethane. The use of such dual function catalysts is preferred, but a separate catalyst may, if desired, be used for urethane formation. If used, a urethane catalyst is normally used in amounts between about 0.05 and 3% by weight based on polyisocyanate. Suitable dual function catalysts include, for instance, one or more metal carboxylates such as potassium acetate, potassium octoate, sodium octoate or calcium octoate. Mixtures of such carboxylates with tertiary amines are also suitable as are N-hydroxyalkyl quaternary ammonium carboxylates. Suitable urethane catalysts include, for instance, tertiary amines such as triethyl amine or dimethyl ethanol amine as well as 1,4-diazadicyclooctane(2,2,2) and organo tin compounds such as dibutyl tin diacetate, stannous octoate and dibutyltin dilaurate.

Polyols useful in this invention comprise at least about 60% of the polyol mixture of a material prepared by the transesterification with a glycol of molecular weight from about 60 to about 400 of residue remaining after dimethyl terephthalate and methyl p-toluate have been removed from dimethyl terephthalate esterified oxidate reaction product, the major portion of said residue comprising a mixture of methyl and benzyl esters of benzene and biphenyl di- and tricarboxylic acids. The polyol is used in foams of the invention in amounts between about 0.1 and about 1.0 hydroxyl equivalent of total polyol per equivalent of polyisocyanate. Use of between about 0.15 and about 0.25 hydroxyl equivalent of polyol on the same basis is frequently preferred. Polyol used in forming reaction mixture and foam of the invention comprises at least about 60% by weight, preferably at least about 75% by weight and still more preferably at least about 95% by weight of polyol mixture prepared by transesterification with a glycol of molecular weight from about 60 to about 400 of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. Such polyol mixtures are described in detail in U.S. Pat. No. 4,237,238 the disclosure of which is incorporated herein by reference.

The transesterified polyol mixture may be prepared by heating the residue defined above with the transesterifying glycol in accordance with the procedures described in U.S. Pat. No. 3,647,759 the disclosure of which is also incorporated herein by reference.

The transesterifying step is simply the replacement of the non-hydroxyl containing carbomethoxy groups in the various aromatic esters of the residue by the glycol agents so that the ester groups now contain, for the most part, terminal hydroxyl groups. Illustrative of the esterifying glycols which can be employed are ethylene glycol, 1,3-propylene glycol, 1,2-propylene glycol, 1,4-butanediol, 1,2-hexanediol, 1,6-hexanediol, diethylene glycol, dipropylene glycol, tripropylene glycol, polyoxyethylene glycols, and polypropylene glycols. A preferred group of glycols consists of ethylene glycol and diethylene glycol with the latter being most preferred.

Examples of ethylene glycol and diethylene glycol transesterified residues which are used in accordance with the present invention are those produced commercially under the tradename of Terate resins and supplied by Hercules, Inc., Wilmington, Delaware and Chardol resins supplied by Chardonol Corporation. Polyol viscosity sometimes requires adjustment or modification in order to balance component pumping rations or to satisfy some other processing requirement. Although the polyol mixtures can be readily produced as fluid materials, particularly by employing excess glycol transesterifying agent and leaving residual glycol in the resin, it is also feasible to employ additional diluents with the polyol mixtures.

As mentioned earlier, the polyol mixtures described above must comprise at least about 60% by weight and preferably at least about 75% by weight of the total polyol content of reaction mixtures and foams of the invention. The remaining polyol content, if any, of reaction mixtures and foams of this invention may be any polyol of the types conventionally used in making rigid polyurethane and polyisocyanurate foams. Suitable polyols include those mentioned in U.S. Pat. No. 4,094,869 the disclosure of which is incorporated herein by reference.

The other polyols useful in this invention include those having at least two hydroxyl groups per molecule and having equivalent weights falling in the range of from 20 to 5000. Specific polyols include butane diol, cyclohexane dimethanol, tripropylene glycol, amide diols, urethane diols, polyether polyols such as poly(tetramethylene ether) diols, poly(propylene ether) polyols, polyester polyols, and the like.

Polyhydroxy polyethers are suitable and preferably those having at least 2 hydroxyl groups per molecule.

Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propanes and 4,4'-dihydroxy diphenyl propane. Sucrose polyethers also may be used. Polybutadienes having hydroxyl groups as well as other known hydroxyl containing vinyl polymers can be used. Hydroxyl containing polyesters, polythioethers, polyacetals, polycarbonates or polyesteramides of the types known for the formation of polyurethanes may also be used.

Foaming agents and other optional additives such as dispersing agents, cell stabilizers, surfactants, flame retardants, and the like, can be employed according to the teachings of the patents referred to above. Use of flame retardants tends to even further improve compatibility of the polyols and blowing agents used in accordance with the invention. In this respect suitable flame retardants include tris(dichloropropylphosphate) as a preferred flame retardant for use in this invention.

A conventional surfactant, such as a silicone surfactant is preferably incorporated in the reaction system of the invention in amounts between about 0.5 and about 3% by weight based on isocyanate. Illustrative of these are the polyoxyalkylenepolydimethyl siloxane block copolymers. Other nonionic, cationic, and anionic surface active agents may also be used.

The proportion of isocyanate groups to hydroxyl groups in the reactant polyols described above (and thus including the total polyols) is desirably from 1 to 10 and preferably 4 to 7, respectively. The amounts of bicyclic amide acetal in the reactant polyols is desirably from 1 to 50% by weight and preferably 5 to 30%. Bicyclic amide acetals have been considered as at least bifunctional towards isocyanate thus additional isocyanate in addition to as described above is used. The overall proportion of isocyanate groups to combined hydroxyl and bicyclic amide acetal functionality is in the range of from 1 to 10 and preferably 3 to 7 respectively.

Reaction mixture of the invention may be formed by mixing the required ingredients of the foam (except for the polyisocyanate) in any suitable manner such as by introducing all of the ingredients into a suitable container or receptical and stirring or blending to obtain a relatively stable, homogeneous mixture. The ingredients may be introduced sequentially or simultaneously. Polyisocyanate is then added to initiate the reactions necessary to make rigid foams of the invention. Reaction mixture of the invention may, for instance, be combined with polyisocyanate immediately prior to or simultaneously with the dispensing of the mixture onto a moving conveyor belt to foam the mixture to form rigid foam which may be post cured, all in a conventional manner. Post curing is generally carried out in the absence of moisture at ambient or, if desired, to accelerate the cure, at elevated temperatures, the permissible range being desirably about 20 degrees to 100 degrees C. for periods of time which will vary inversely with the curing temperature employed and varying from about 2 to about 48 hours. This post cure serves to complete the formation substantially of trimer within the foam structure.

Because of the improved compatibility between ingredients due to the presence of the bicyclic amide acetal, reaction mixture of the invention has greatly improved stability. Depending upon such factors as storage temperature, amount of agitation during storage, presence of surfactant or flame retardant and amounts and types of polyols and bicyclic amide acetal used, reaction mixtures of the invention will remain homogeneous with no noticeable separation of blowing agent for periods of time ranging from a few minutes to almost indefinitely. In many instances reaction mixture of the invention will remain stable and homogeneous for at least about 20 minutes. This allows the mixtures to be completely formed and then stored for at least a short time before use. By contrast, in reaction mixtures of this general type taught by the prior art, e.g., U.S. Pat. No. 4,237,238, the fluorocarbon blowing agent begins to separate almost immediately so that uneven foam results if the mixture is not used immediately.

Use of commonly known fillers such as talc; alumina; glass beads etc. is within the scope of this invention.

The following representative examples will further illustrate the invention.

EXAMPLE 1

This example is outside the scope of the present invention and is used to illustrate the lack of compatibility of the fluorocarbon blowing agent and polyol of the type described in U.S. Pat. No. 3,647,759. In a 25 ml. jar were placed 10.1 g of commercially available polyterephthalic ester polyol (Chardol 570 having a hydroxy number of about 350) which was a polyol mixture prepared by transesterification with a glycol of molecular weight from about 60 to 400 of a residue remaining after dimethyl terephthalate esterified oxidate reaction product, the major portion of said residue comprising a mixture of methyl and benzyl esters of benzene and biphenyl di- and tricarboxylic acids. To this was blended vigorously with 4.01 g of trichlorofluoromethane blowing agent (Freon F-11B from DuPont). The closed jar was then allowed to stand undisturbed at room temperature and a phase separation was observed to occur in less than 5 minutes.

EXAMPLE 2

The polyterephthalic ester polyol described in Example 1 (Chardol 570) (10.07 g) was mixed with 3.02 g of bicyclic amide acetal of Formlula I wherein R, R' and R''' represent hydrogen and R'' represents methyl to give a solution. To this solution was added 4.0 g of Freon F-11B as in Example 1 and after vigorous mixing no phase separation was observed even after one hour standing undisturbed at room temperature.

EXAMPLE 3

A repeat of Example 2 using the indicated amount of polyol, 2.01 g of bicyclic amide acetal and 4.59 g of Freon resulted in no phase separation after one hour undisturbed at room temperature.

EXAMPLE 4

The procedure of Example 2 was followed using the indicated amount of polyol, 1.09 g of bicyclic amide acetal and 4.2 g of Freon. No phase separation was observed within 30 minutes after the mixture stood undisturbed at room temperature.

EXAMPLE 5

The procedure of Example 2 was followed using the indicated amount of polyol, 4.04 g of bicyclic amide acetal and 4.41 g of Freon. The solution remained homogeneous even after one hour standing undisturbed at room temperature. Additional Freon (2.07 g) was mixed with this solution and the mixture was shaken and kept at room temperature undisturbed for another 45 minutes during which time no phase separation occurred.

EXAMPLE 6

This Example, which is outside the scope of the present invention, demonstrates the formation of a rigid foam by the prior art method which does not include the use of a bicyclic amide acetal compatibilizing agent. The polyterephthalic ester polyol of Example 1 (Chardol 570 polyol) (12.24 g), 0.2 g of low viscosity silicon-glycol copolymer surfactant (DC-193), 0.2 g of tertiary amine catalyst (Polycat 41, N,N',N''-tris (dimethylaminopropyl hexahydrotriazine) and 4.5 g of Freon (F-11B) were vigorously mixed in a paper cup and to this mixture was added 12.4 g of 4,4'-diphenylmethane diisocyanate which has been modified according to U.S. Pat. 3,384,653. This material was mixed for 10 seconds and kept at room temperature for the foam formation. The foam was found to cream in 20 seconds, rise time was 40 seconds and tack-free time (gel time) was found to be 46 seconds. The resulting rigid foam was irregular with some unrisen polymer at the bottom of the cup (unfoamed portion, about 20-25% of the total). The more uniform part of the foam near the top was found to have a density of 2.3 pounds/cu.ft. and compressive strength of 20 psi.

EXAMPLE 7

The procedure of Example 6 was followed using 10.12 g of Chardol polyol, 3.44 g of the bicyclic amide acetal of Example 1, 0.2 g of silicone surfactant and 5 g of Freon. The mixed solution was mixed with 17.9 g of the polyisocyanate and no catalyst was used. The resulting foam was found to have a cream time of 50 seconds, a rise time of 100 seconds and a tack free time of 110 seconds. The resulting foam was post cured at 95 degrees C. for 5 minutes to give low surface friability. The physical properties for this foam were: density of 2.3 pounds/cu. ft. and compressive strength of 20.5 psi.

EXAMPLE 8

The procedure of Example 6 was followed using the same charge as in Example 7 except that 0.25 g of the tertiary amine catalyst was also used. The foaming characteristics of the mixture were: cream time of 20 seconds, rise time of 40 seconds and tack free time of 48 seconds. The resulting rigid foam was found to have a density of 2.5 pounds/cu.ft. and a compressive strength of 22.5 psi.

EXAMPLE 9

The procedure of Example 6 was followed using 15.3 g of Chardol polyol, 3.0 g of tripropylene glycol, 2.4 g of the bicyclic amide acetal, 0.28 g of Polycat 41 catalyst, 0.25 g of silicone surfactant and 6 g of Freon (F-11B). The mixture was reacted with 23 g of polyisocyanate. The characteristics of the resulting foam were: cream time of 18 seconds, rise time of 48 seconds, tack free time of 60 seconds. The density of the foam was found to be 2.1 pounds/cu.ft. with compressive strength of 19 psi.

EXAMPLE 10

The procedure of Example 6 was followed using 15.3 g of Chardol polyol, 3 g of the bicyclic amide acetal, 0.24 g of silicone surfactant (DC-193), 0.35 g of catalyst (Polycat 41) and 5.6 g of Freon. This mixture was allowed to react with 25 g of the modified isocyanate of Example 6. The foaming characteristics of the resulting rigid foam were: cream time of 28 seconds, rise time of 35 seconds and tack free time of 40 seconds. The foam was post cured at 95 degrees C. for 5 minutes. The resulting foam was found to have a density of 2.4 pounds/cu. ft. and compressive strength of 25 psi.

EXAMPLE 11

The procedure of Example 2 was followed except that the polyterephthalic ester polyol used was Terate 203 (from Hercules, Inc. hydroxy number 320). This polyol (10.01 g) was mixed with 2.03 g of the bicyclic amide acetal and then mixed with 4.15 g of fluorocarbon blowing agent (Freon F-11B). No phase separation was noticed even after 2 hours standing at room temperature.

EXAMPLE 12

The procedure of Example 11 was followed using 10.21 g of Terate 203 polyol, 4.35 g of the bicyclic amide acetal and 6.28 g of Freon (F-11B). No phase separation was observed after 2 hours standing at room temperature.

EXAMPLE 13

The procedure of Example 6 was followed using 13 g of Chardol polyol (hydroxy number 447), 2.2 g of bicyclic amide acetal, 0.4 g of silicon surfactant, 0.24 g of Polycat 41 catalyst, 8 g of Talc filler, and 6 g of Freon. The mixture was reacted with 22.3 g of polyisocyanate. The characteristics of the resulting foam were: creamtime of 18 seconds, rise time of 28 seconds, tack free time of 35 seconds. The density of the foam was found to be 1.89 pounds/cu.ft. with compressive strength of 18 psi.

We claim:

1. A rigid cellular foam comprising the cured reaction product of a polyisocyanate with between about 0.1 and about 1.0 hydroxyl equivalent of polyol per equivalent of said polyisocyanate, said polyol comprising at least about 60 percent polyol mixture prepared by the transesterification with a glycol of molecular weight from about 60 to 400 of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di and tricarboxylic acids, said reaction of polyisocyanate and polyol taking place in the presence of
   (a) isocyanate trimerization catalyst;
   (b) fluorocarbon blowing agent; and
   (c) between about 1 and 50% by weight based on total polyol of bicyclic amide acetal of the formula

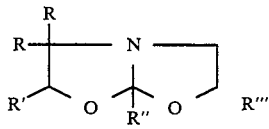

Wherein R represents hydrogen or an alkyl group containing from 1 to 10 carbon atoms, R' represents hydrogen, an alkyl group having from 1 to 10 carbon atoms or an aryl group containing from 6 to 12 carbon atoms, R" represents an alkyl group containing from 1 to 20 carbon atoms, an aryl group containing from 6 to 12 carbon atoms or an alkaryl group containing from 7 to 20 carbon atoms and R'" represents hydrogen, an alkyl group containing from 1 to 20 carbon atoms, an aryl group containing from 6 to 12 carbon atoms or an alkyl or aryl ether group containing from 1 to 20 carbon atoms.

2. The rigid foam of claim 1 wherein R, R' and R'" represent hydrogen and R" represents an alkyl group.

3. The rigid foam according to claim 1 wherein the total polyol is present in amounts sufficient to supply between about 0.15 and about 0.50 hydroxyl equivalent of polyol per equivalent of polyisocyanate.

4. The rigid foam according to claim 1 wherein said polyol prepared by transesterification of residue comprises at least about 75% of the total polyol.

5. The rigid foam according to claim 1 wherein the polyisocyanate is an aromatic polyisocyanate.

6. The rigid foam according to claim 1 wherein the blowing agent is trichlorofluoromethane.

7. The rigid foam according to claim 1 wherein the bicyclic amide acetal is present in an amount between about 1 and about 50% by weight based on total polyol.

8. The rigid foam according to claim 1 wherein said blowing agent is present in an amount between about 5 and 50% by weight based on polyisocyanate.

9. The rigid foam according to claim 1 wherein said polyol prepared by transesterification of residue comprises at least about 95% of the polyol in said mixture.

10. A reaction mixture comprising:
    (a) A fluorocarbon blowing agent;
    (b) a glycol comprising at least about 60% polyol mixture prepared by the transesterification with a glycol of molecular weight from about 60 to about 400 of residue remaining after dimethyl terephthalate and methyl p-toluate have been removed from dimethyl terephthalate esterified oxidate reaction product, the major portion of said residue comprising a mixture of methyl and benzyl esters of benzene and biphenyl di- and tricarboxylic acids; and
    (c) between about 1 and about 50% based on total polyol of a bicyclic amide acetal of the formula:

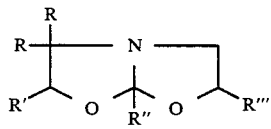

wherein R represents hydrogen or an alkyl group containing from 1 to 10 carbon atoms, R' represents hydrogen, an alkyl group containing from 1 to 10 carbon atoms or an aryl group containing from 6 to 12 carbon atoms, R" represents an alkyl group containing from 1 to 20 carbon atoms, an aryl group containing from 6 to 12 carbon atoms or an alkaryl group containing from 7 to 20 carbon atoms and R'" represents hydrogen, an alkyl group containing from 1 to 20 carbon atoms, an aryl group containing from 6 to 12 carbon atoms, or an alkyl or aryl ether group containing from 1 to 20 carbon atoms.

11. The reaction mixture of claim 10 wherein said polyol prepared by transesterification of residue comprises at least about 75% of the polyol in said mixture.

12. The reaction mixture of claim 10 wherein the polyisocyanate is an aromatic polyisocyanate.

13. The reaction mixture of claim 10 wherein the blowing agent is trichlorofluoromethane.

14. The reaction mixture of claim 10 wherein the bicyclic amide acetal is present in an amount between about 1 and about 50 weight percent based on total polyol.

15. The reaction mixture of claim 10 wherein said polyol prepared by transesterification of residue comprises at least about 95% of the polyol in said mixture.

16. The reaction mixture of claim 10 wherein the bicyclic amide acetal is one in which R, R' and R''' represent hydrogen and R'' represents an alkyl group.

17. The reaction mixture of claim 10 wherein the blowing agent is trichlorofluoromethane and is present in amount between about 15 and 175% by weight based on polyol.

* * * * *